United States Patent

[11] 3,615,441

[72] Inventor Alan L. Deneau
317 Moran, Grosse Pointe Farms, Mich. 48236
[21] Appl. No. 23,891
[22] Filed Mar. 30, 1970
[45] Patented Oct. 26, 1971

[54] COLOR CORRECTION BY MASKING FOR A FOUR-COLOR PRINTING PROCESS
5 Claims, 7 Drawing Figs.

[52] U.S. Cl. .......... 96/30, 96/5, 96/44
[51] Int. Cl. .......... G03f 3/00
[50] Field of Search .......... 96/30, 31, 44, 5

[56] References Cited
UNITED STATES PATENTS

| | | | |
|---|---|---|---|
| 2,177,195 | 10/1939 | Wilkinson .......... | 96/30 |
| 3,329,501 | 7/1967 | Peaty .......... | 96/30 |
| 3,337,343 | 8/1967 | Hove .......... | 96/31 |

*Primary Examiner*—Norman G. Torchin
*Assistant Examiner*—Alfonso T. Suro Pico
*Attorney*—Cullen, Settle, Sloman and Cantor

ABSTRACT: For use in the four-color printing process, individual masks are made for preparation of the cyan, magenta and yellow halftones. Each mask achieves both undercolor removal and all of the required color correction. A dual purpose shadow mask and cyan undercolor removal mask is prepared by exposure through the premask, black separation and cyan separation. The magenta undercolor removal mask is made by two separate exposures: a color correction exposure through the cyan and yellow separations and shadow mask; and an undercolor removal exposure through the black separation and premask. The yellow undercolor removal mask is also made by two separate exposures: a color correction exposure through the magenta separation, premask and shadow mask; and an undercolor removal exposure through the black separation and premask.

INVENTOR.
ALAN L. DENEAU.
BY:
CULLEN, SETTLE, SLOMAN & CANTOR
ATT'YS.

COLOR CORRECTION BY MASKING FOR A FOUR-COLOR PRINTING PROCESS

BACKGROUND OF INVENTION

The preparation of the halftones used in the conventional four-color printing process involves the initial step of making a premask. The premask is a short exposure of the subject made through one or more filters. Its purpose is to reduce contrast, to allow darker areas of the subject to be subsequently picked up without over exposure of the brighter areas. It accomplishes this, since the short exposure renders only the bright areas of the subject somewhat opaque, thus "masking" or partially blocking light transmission through such areas and leaving all other areas fully open or transparent. Some color correction is also accomplished with the premask.

Next, the four separation negatives are prepared. Each separation is exposed through the premask and an appropriate filter. By using a different primary color filter for each separation, the separation negative is left unexposed and transparent only to those areas of the subject which do not reflect the color passed by the filter. The separation negative also remains unexposed and transparent in the black or heavy shadow areas, since such areas reflect no light.

The use of a green filter therefore produces the "magenta" (reddish-blue) separation negative, since magenta is the color produced when green is subtracted from white light. That is, the magenta separation will be exposed and opaque in the green areas, and unexposed and transparent in the magenta and black areas.

Similarly, the use of a red filter results in the "cyan" (greenish-blue) separation negative, which will be unexposed and transparent to only cyan and black. The use of a blue filter produces the "yellow" separation, since yellow is what is left when blue is subtracted from white light. The yellow separation will therefore be unexposed and transparent only to yellow and black.

The "black" separation negative is prepared by making three successive exposures through the green, blue and red filters. Hence, the black separation will be unexposed and transparent only in the black and heavy shadow areas of the subject.

The next step is the preparation of the "undercolor removal" mask. As described above, the cyan, magenta and yellow separations are each unexposed and transparent in the black or heavy shadow areas of the subject. If the halftones (from which the printing plates are made) were made directly from such separations every plate would deposit its color ink in the black areas of the subject. This would result in too much ink in such areas, leading to uncontrollable and distorted color reproduction in black and shadow areas. Therefore, an undercolor removal mask is conventionally employed to hold back the cyan, magenta and yellow from the black and heavy shadow areas. This mask is simply a positive made from the black separation negative, thus becoming substantially opaque in the black and heavy shadow areas.

The halftones can now be made. The magenta halftone exposed through a combination of the properly registered magenta separation negative, undercolor removal mask and a screen; the cyan halftone through the cyan separation, undercolor removal mask and screen; the yellow halftone through the yellow separation, undercolor removal mask and screen; and the black halftone through the black separation and screen only.

Because of process variables such as filters, films, printing inks, lighting, etc., some imperfections in color reproduction occur. These imperfections require highly skilled, costly and time-consuming work by an etcher, who must study the finished product and decide which color plate or plates must be etched and for how long to restore the correct coloration.

Previous attempts have been made to introduce some color correction into the original preparation of the halftones to reduce the costly work of the etcher. These attempts have not been successful, since compromises have been necessary in the attempt to achieve the desired degree of color correction while preserving the essential undercolor removal step. If one color was properly corrected, another color was thrown off. Subsequent correction of the printing plates by the etcher was still necessary.

Accordingly, it is the principal object of this invention to eliminate the color correction step of selectively retouching the printing plates, previously necessary to accurately reproduce the colors of the original subject.

DETAILED DESCRIPTION OF THE INVENTION

As described above, the basic four-color printing process comprises the steps of preparing a premask, then the magenta, cyan, yellow and the black separation negatives, one or more undercolor removal masks and finally preparing the four halftones by a composite exposure of the undercolor mask with each of the respective color separations and a screen.

The present invention involves an improved technique for preparing the undercolor removal masks. No change has been made in the conventional preliminary steps of preparing the premask and the four color separation negatives, which steps will therefore not be described herein. For purposes of the following description, the DuPont "Neomask" premask has been used, but it is to be understood that other premasks could be employed with only minor adjustments necessary as will be understood by those skilled in the art.

The first step of the improved process for preparing undercolor removal masks is the preparation of the dual purpose "shadow mask" and cyan undercolor removal mask. This step is illustrated schematically in FIG. 1. For simplicity, this dual purpose mask will be referred to as the "shadow mask."

Figure 1:
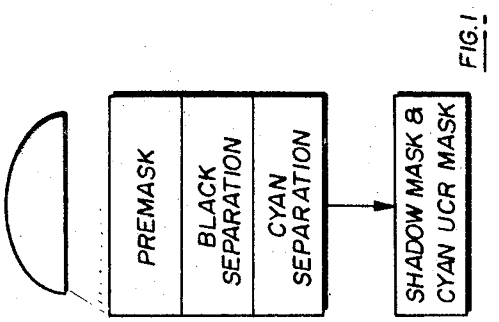
FIG. 1 is a schematic illustration of the exposure employed to prepare the dual-purpose shadow mask and cyan undercolor removal mask.

As shown in FIG. 1, the shadow mask is made by exposing a piece of DuPont CMF–4 masking film through the superimposed Neomask and black and cyan separation negatives. This is a 45 second exposure, using a K & M (12 volt) light source at 6½ feet. The exposed masking film is then processed in Kodak HC–110 developer diluted in water to a concentration of 1:16 for about 2 minutes.

The presence of the black separation negative as part of this exposure cancels out all color to a considerable extent, leaving only the extreme black shadows fully open to the exposure. The developed shadow mask will accordingly be a positive which is substantially opaque in the black and heavy shadow areas of the subject, and will therefore hold back the light from such areas when the shadow mask is subsequently used as part of the color correction step in the preparation of both the magenta and yellow undercolor removal masks.

The shadow mask thus provides an accurate and uniform means for controlling the black areas. As will be understood from the explanation of FIGS. 2 and 3, the undercolor removal step is separated from the color correction step, since the shadow mask holds back or blocks exposure of the black or heavy shadow areas during the subsequent color correction steps. This permits fuller and more accurate development of the important middle tone areas without developing too much tone in the shadow areas.

As described above, the shadow mask also serves as the cyan undercolor removal mask. There are several reasons for using the cyan separation negative as an element in preparing the shadow mask. In the first place, it is desirable to use one of the separation negatives to partially cut the density of the shadow mask. The cyan separation, in particular is safer because the other color separations have a tendency to distort the colors. It also produces further contrast between blue and black. The use of the cyan separation simplifies production by permitting uniform solution concentrations and exposure times. Furthermore, the use of the cyan separation negative permits the shadow mask to also function as the cyan undercolor removal mask, since cyan is the only separation negative which normally requires no color correction.

Figure 2:
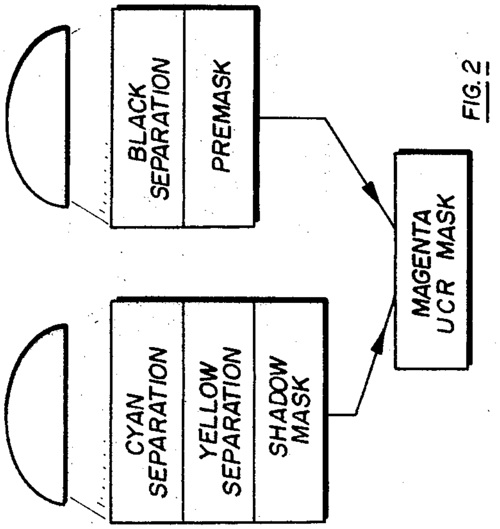
FIG. 2 is a schematic illustration of the sequence of two exposures employed to prepare the magenta undercolor removal mask.

The next step, illustrated schematically in FIG. 2, involves the preparation of the magenta undercolor removal mask. This is a sequence of two separate exposures of a new piece of masking film. The first exposure is the color correction step, while the second exposure is the undercolor removal step.

It is normally necessary to reduce the degree of magenta appearing in the green areas of the subject. Therefore, as shown on the left side of FIG. 2, the color correction exposure comprises the use of the cyan and yellow separation negatives along with the shadow mask. The presence of the yellow and cyan separations (which together are transparent only to green) means that this new piece of masking film to be used as the magenta mask will be exposed only in the green areas of the subject. Therefore, when developed, it will be partially opaque in the green areas, and when used with the magenta separation will prevent magenta from coming through in the green areas of the magenta halftone. This color correction step is a 45 second exposure, with no change in the other parameters described above.

The second exposure or undercolor removal step in preparing the magenta mask is illustrated schematically on the right side of FIG. 2. The cyan and yellow separations and the shadow mask are removed from the once-exposed masking film and are replaced by the black separation negative and the Neomask. This combination, being transparent in the black and heavy shadow areas, produces a further exposure of such areas on the once-exposed masking film. Thus, the resulting magenta undercolor removal mask will be relatively opaque in the black and heavy shadow areas, preventing any substantial deposition of magenta ink in those areas of the finished product. A 30 second exposure is then made, which functions to take care of the undercolor removal problem.

Hence, both the color correction and the undercolor removal problems in the magenta mask have been taken care of, but by separate exposure steps, to permit the desired degree of each adjustment to be chosen independently of the other. Thus, maximum tailoring of the process is provided to compensate for any variables involved.

Figure 3:
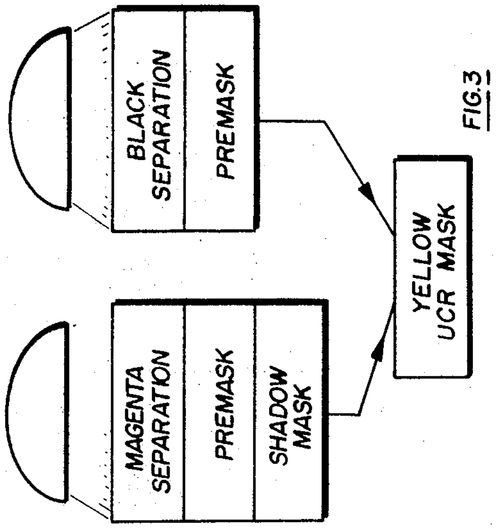
FIG. 3 is a schematic illustration of the sequence of two exposures employed to prepare the yellow undercolor removal mask.

The next major step is the preparation of the yellow undercolor removal mask illustrated schematically in FIG. 3. This also is a sequence of two exposures, with the color correction exposure illustrated on the left side of the Figure and the undercolor removal exposure illustrated on the right side of the Figure.

Generally, four color printing requires a reduction in the amount of yellow appearing in the magenta areas. Accordingly, the magenta separation (which is transparent to magenta) is employed in preparing the yellow undercolor removal mask, since it will make the yellow mask partially opaque in the magenta areas. The shadow mask is again used in this step to hold back or block the black and heavy shadow areas, to which the magenta separation is also transparent. The Neomask is also used in this step to further reduce the density. Alternatively, the cyan separation could be used in place of the Neomask. This is a 30 to 45 second exposure with 45 seconds being preferred.

The second exposure illustrated on the right side of FIG. 3 is the same as the corresponding undercolor removal exposure described above in the preparation of the magenta mask. It involves the removal of the superimposed magenta separation and Neomask and shadow mask and replacing them with the superimposed black separation negative and Neomask. As in the case of the magenta mask, this second exposure causes the yellow mask to become relatively opaque in the black and heavy shadow areas, to prevent any substantial deposition of yellow ink in such areas of the finished product. This exposure should be from 30 to 45 seconds, with 30 seconds being preferred.

This now completes the preparation of the separate undercolor removal masks for cyan, magenta and yellow.

Figure 4:
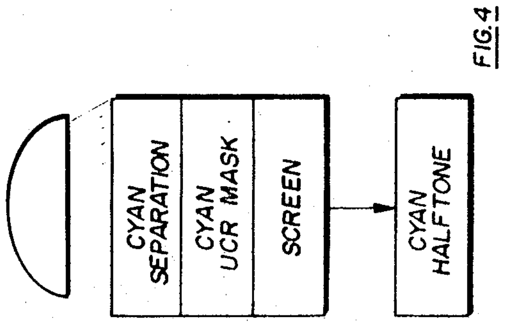
FIG. 4 is a schematic illustration of the exposure employed to prepare the cyan halftone.
Figure 5:
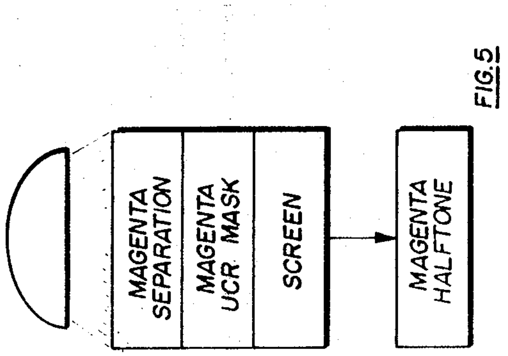
FIG. 5 is a schematic illustration of the exposure employed to prepare the magenta halftone.
Figure 6:
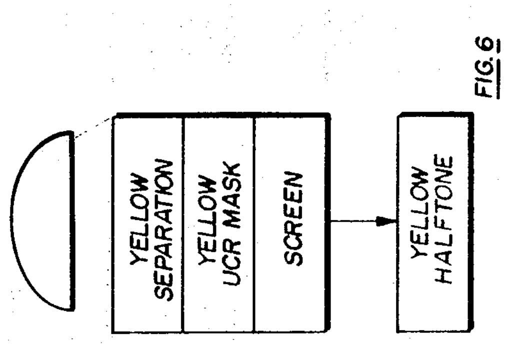
FIG. 6 is a schematic illustration of the exposure employed to prepare the yellow halftone.
Figure 7:
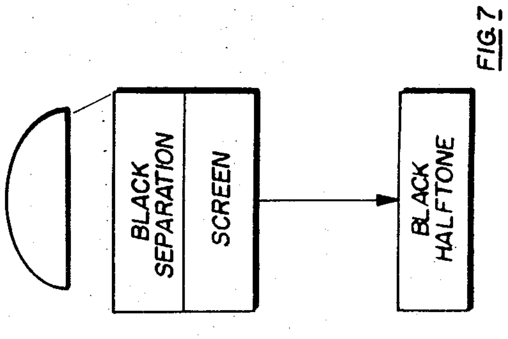
FIG. 7 is a schematic illustration of the exposure employed to prepare the black halftone.

As shown in FIGS. 4 through 6, respectively, the cyan, magenta and yellow undercolor removal masks are paired with the corresponding separation negatives plus a screen for the preparation of the corresponding three halftones. As shown in FIG. 7, the black halftone is prepared by simply exposing through the black separation and screen. These steps are conventional, except that the nature of the mask used with each separation is different from what has been previously employed.

Thus, the above described process eliminates the need for corrective etching of the printing plates. By using specially prepared masks with each of the cyan, magenta and yellow separations, and by separately exposing the color correction and undercolor removal steps for both the magenta and yellow masks, the appropriate amount of both color correction and undercolor removal is assured for each color.

Variations in printing inks, filters, premasks, films, lighting, etc., can be compensated for by making appropriate adjustments in exposure times for one or both of the color correction and undercolor removal exposures. No compromising of these independent factors is required.

If color corrections other than those described above were desired, the appropriate separation or separations would be utilized during the color correction exposure of the mask involved, as will be understood from the above description by those skilled in the art. The shadow mask could, if desired, be made by using the superimposed cyan, magenta and yellow separations, instead of the black separation, but this would complicate the handling and lengthen the exposure times.

This invention may be further developed within the scope of the following claims. Accordingly, the above specification is to be interpreted as illustrative of only a single operative embodiment of this invention, rather than in a strictly limited sense.

I now claim:

1. In the conventional four-color printing process comprising the steps of preparing a premask, magenta, cyan, yellow and black separation negatives, an undercolor removal mask or masks, and magenta, cyan, yellow and black halftones, the improved method of color correction and undercolor removal, which comprises the steps of:

creating a dual purpose shadow mask-cyan undercolor removal mask by exposing a masking film through a superimposed combination of the premask, black separation negative and cyan separation negative and then developing the image thus created;

creating a magenta undercolor removal mask by separately and sequentially exposing a masking film by a first exposure through a first superimposed combination of the cyan separation negative, the yellow separation negative and said shadow mask, and by a second exposure through a second superimposed combination of the black separation negative and the premask, and then developing the image thus created;

creating a yellow undercolor removal mask by separately and sequentially exposing a masking film by a first exposure through a first superimposed combination of the magenta separation negative, the premask and said shadow mask, and by a second exposure through a second superimposed combination of the black separation negative and the premask and then developing the image thus created;

and finally creating the respective cyan, magenta and yellow halftones by exposing the respective three films to the superimposed combination of a screen and the corresponding separation negative and undercolor removal mask for the respective color, and creating the black halftone by exposing a fourth film to the superimposed combination of a screen and the black separation, and developing the four respective halftones thus created.

2. In the conventional four-color printing process comprising the steps of preparing a premask, magenta, cyan, yellow and black separation negatives, an undercolor removal mask or masks, and magenta, cyan, yellow and black halftones, the improved method of color correction and undercolor removal, which comprises the steps of:

creating a shadow mask by exposing a masking film through the black separation negative, and then developing the image thus created;

creating a magenta undercolor removal mask by separately and sequentially exposing a masking film by a first exposure through a first superimposed combination of the cyan separation negative, the yellow separation negative and said shadow mask, and by a second exposure through the black separation, and then developing the image thus created;

creating a yellow undercolor removal mask by separately and sequentially exposing a masking film by a first exposure through a first superimposed combination of the magenta separation, either the cyan separation or the premask, and said shadow mask, and by a second exposure through the black separation, and then developing the image thus created;

and finally creating the magenta halftone by exposing a film through a superimposed combination of the magenta separation and said magenta undercolor removal mask and a screen, and creating the yellow halftone by exposing a film through a superimposed combination of the yellow separation and said yellow undercolor removal mask and a screen, and developing the images thus created.

3. The method of claim 2, wherein said second exposure in the creation of each of the magenta and yellow undercolor removal masks is made through a superimposed combination of the black separation negative and the premask.

4. The method of claim 2, wherein said shadow mask is created by an exposure through a superimposed combination of the premask and the black separation negative.

5. The method of claim 2, wherein said shadow mask is created by an exposure through a superimposed combination of the premask, the black separation negative and the cyan separation negative, and wherein said resulting shadow mask is also used as the cyan undercolor removal mask, wherein the cyan halftone is created by exposing the film through a superimposed combination of the cyan separation, said cyan undercolor removal mask and a screen.